United States Patent [19]

Kogure et al.

[11] Patent Number: 4,656,862

[45] Date of Patent: Apr. 14, 1987

[54] PRESS MACHINE

[75] Inventors: Tsuneo Kogure; Yuji Tsuchiyama, both of Hatano; Tadashi Amano, Sagamihara; Hideaki Takahashi, Atsugi; Katsuji Sekita, Hiratsuka; Ichio Akami, Atsugi, all of Japan

[73] Assignee: Amada Company, Limited, Japan

[21] Appl. No.: 792,529

[22] Filed: Oct. 29, 1985

Related U.S. Application Data

[62] Division of Ser. No. 642,767, Aug. 21, 1984, Pat. No. 4,608,857.

[30] Foreign Application Priority Data

| | | | |
|---|---|---|---|
| Aug. 24, 1983 | [JP] | Japan | 58-129755 |
| Sep. 2, 1983 | [JP] | Japan | 58-135388 |
| Sep. 7, 1983 | [JP] | Japan | 58-137797 |
| Sep. 14, 1983 | [JP] | Japan | 58-168349 |
| Sep. 14, 1983 | [JP] | Japan | 58-141574 |

[51] Int. Cl.[4] .......................... B21J 7/46; F16K 31/02

[52] U.S. Cl. .......................................... 72/443; 72/2; 72/389; 72/453.01; 251/295; 251/129.08

[58] Field of Search .................. 251/295, 251, 129.08; 72/389, 2, 443, 453.04, 453.01, 441

[56] References Cited

U.S. PATENT DOCUMENTS

| | | | |
|---|---|---|---|
| 3,247,912 | 4/1966 | Reynolds | 251/129.08 |
| 4,170,124 | 10/1979 | MacGregor | 72/389 |
| 4,314,585 | 2/1982 | Nishimiya et al. | 251/129.08 |
| 4,466,337 | 8/1984 | Eiler | 251/129.08 |

FOREIGN PATENT DOCUMENTS

| | | |
|---|---|---|
| 1111013 | 4/1968 | United Kingdom . |
| 1190703 | 5/1970 | United Kingdom . |
| 2018175 | 10/1979 | United Kingdom . |

*Primary Examiner*—Robert L. Spruill
*Assistant Examiner*—David B. Jones
*Attorney, Agent, or Firm*—Wigman & Cohen

[57] ABSTRACT

The present invention relates to a press machine that has a vertically movable ram for supporting upper or lower bending tools, said ram being integrally provided with an operation member, and a position determining member having an adjustable position located at a suitable point on said press machine such that when the operation member on the ram contacts the position determining member, the vertical movement of the ram is stopped. The press machine further includes a screw mechanism that is screw-coupled to the position determining member and is movable in an axial direction, a pulse motor drive unit which turns the threaded bolt, and a manual pulse generator for operating the pulse motor from a remote location.

7 Claims, 13 Drawing Figures

PRESS MACHINE

CROSS-REFERENCE TO RELATED APPLICATION

This is a divisional of co-pending application Ser. No. 642,767, filed Aug. 21, 1984, commonly assigned now U.S. Pat. No. 4,608,857.

BACKGROUND OF THE INVENTION

1. Field of the Invention

The present invention relates to a press machine, and, more specifically, to a press machine such as a press brake used for bending sheet-like workpieces.

2. Description of the Prior Art

As is well-known, a bending press or press machine such as a press brake for bending sheet-like workpieces such as sheet metals is provided with a pair of upper and lower bending tools, one of which is so arranged as to be vertically moved by a ram toward and away from the other to bend a workpiece. Usually, the lower bending tool is fixed and the upper tool is mounted on the ram to be vertically moved toward and away from the lower bending tool. However, in some bending presses, the upper bending tool is fixed and the lower bending tool is movably held by the ram. In either case, the workpiece to be bent is placed or held on the lower bending tool so that it may be bent when either of the upper and lower bending tools, whichever is movable, is vertically moved toward the fixed tool. Also, the ram carrying the movable bending tool, in many bending presses, is hydraulically operated by a hydraulic means to vertically move the movable bending tool toward and away from the fixed bending tool.

In such a bending press, the bending angle to which the workpiece is to be bent is determined by the limit of travel of the ram to which position the ram is vertically moved to move the movable bending tool toward the fixed bending tool to thus bend the workpiece. Accordingly, it is necessary to accurately set the limit of travel of the ram or the movable bending tool so as to accurately bend the workpiece to a desired angle. In order to accurately control the position to which the ram is raised or lowered, in the case of a hydraulic press, a control valve is installed in the hydraulic circuit to raise or lower the ram. In addition, the press machine or bending press has a position determining member which controls the position to which the ram is raised or lowered by controlling the above-mentioned control valve; and the ram has an operation member which causes the valve to open when it is contacted by the position determining member. That is, when an operation member on the ram contacts the position determining member, the vertical movement of the ram is stopped in order to control its position.

It is desirable for the position determination to be done near the center of the ram. If it is done at one end, the equilibrium of the ram can be upset resulting in a large position error.

The above-mentioned position determining member may consist of a rotating link located on the frame side and at the center of the ram along its length so that it is free to rotate up and down. The operation member on the ram is designed to contact the tip of the rotating link. The position of the ram is determined by setting the angle of the above-mentioned rotating link. Consequently, the operation member, which moves up and down, contacts the rotating link the tip of which describes a circular arc. Since the relationship between the position at which the rotating link angle is set and the position at which the ram is set to stop is not proportional, it is very difficult to accurately set the position at which the ram stops in the vertical direction.

The position of the above-mentioned position determining member can be set either manually or automatically. Manual setting, which is done by rotating a handle provided on the side of the press machine, is difficult to operate accurately. Automatic setting, which is done by the ON/OFF operation of a pushbutton switch on a control box, is also hard to operate accurately.

Control of the speed of vertically moving the ram in a press machine or bending press is accomplished by opening and closing an unloading valve in the hydraulic circuit that drives the ram in the vertical direction. The above-mentioned unloading valve is opened and closed by stepping on a link-type foot pedal on the front of the press machine. This makes it impossible to operate the press machine from a remote location, which is a problem from the point of improving the view of safety of operation of the machine.

Another type of press machine or bending press uses a hydraulic fluid—filled cylinder under the foot pedal, and the pressure on the foot pedal is transmitted through the fluid to operate the unloading valve. However, this method also has problems: the hydraulic hose connected to the foot pedal is large in diameter and rigid, which makes operation difficult; and, when the machine is moved or transported, the foot pedal must be removed from the press machine allowing some of the hydraulic fluid to leak out and get on the floor and other nearby objects.

Still another problem with existing press machines or bending presses is that there is no detection device to directly detect the vertical position of the ram.

SUMMARY OF THE INVENTION

The present invention was conceived with a view to solving the problems described above.

The first purpose of the present invention is to provide a press machine or bending press in which the stop position of its ram in the vertical path of travel is accurately determined in a proportional relationship with the up-and-down motion of the ram.

The second purpose of the present invention is to provide a press machine or bending press in which the setting of the position at which the vertically moving ram is stopped can be set easily and accurately.

The third purpose of the present invention is to provide a press machine or bending press in which the speed of the vertically moving ram can be easily controlled.

A fourth purpose of the present invention is to provide a press machine or bending press in which the position to which the ram has been raised or lowered can be easily detected.

To achieve the objectives listed above, in the press machine or bending press of the present invention the position—determining member which contacts the operation member on the ram to stop the vertical movement of the ram for determining position is adjusted by linear motion.

In addition, the position determining member is moved by a pulse motor. The control section for that motor includes a pulse generator which controls the pulse motor and also an indicator which indicates the position of the position—determining member as judged by the distance the pulse motor has actually moved.

Also, an electromagnetic proportional valve is installed in the hydrualic circuit which drives the ram up and down. The system is designed so that the speed of the vertically moving ram can be controlled by the controlling this electromagnetic proportional valve corresponding to operation of a speed control device. Additionally, a ram position detection device is used which directly detects the position to which the ram has been raised or lowered.

Other and further objects and disadvantages of the present invention will be apparent from the following description and accompanying drawings which, by way of illustration, show preferred embodiments of the present invention and the principles thereof.

DESCRIPTION OF THE PREFERRED EMBODIMENT

Figure 1:
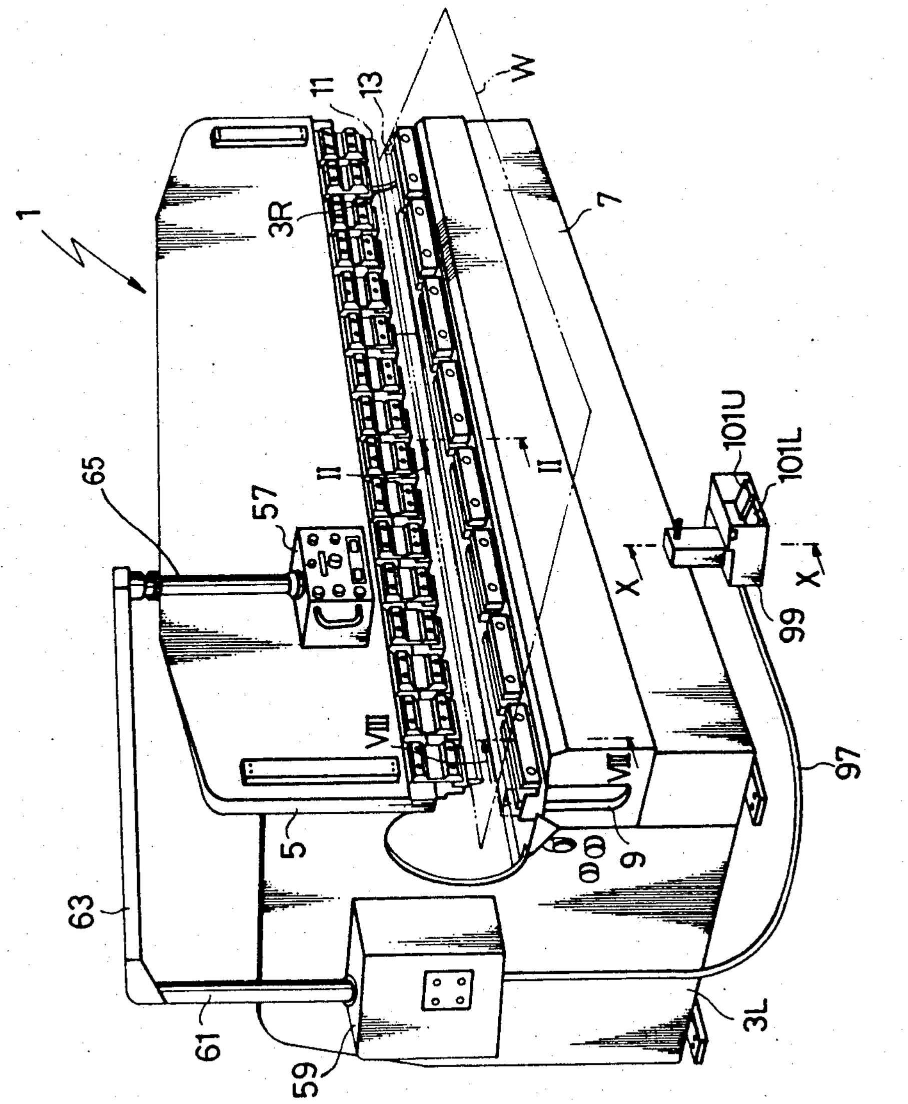
FIG. 1 is a perspective view of a press machine incorporating the present invention.

Referring to FIG. 1, a press machine or bending press 1 such as a press brake has right and left C-shaped side frames 3R and 3L, upper and lower frames 5 and 7 supported on both sides by the right and left frames 3R and 3L, and a ram 9 installed inside the lower frame 7 in an opposing relationship with the upper frame 5. An upper bending tool 11 used for bending sheet-like workpieces W is attached to the bottom of the above-mentioned upper frame 5 so that it can be removed and replaced. A lower bending tool 13 is attached to the top of the ram 9 opposite to the upper bending tool 11 so that it can be removed and replaced.

As will be explained in more detail below, the ram 9 is driven up and down vertically by a hydraulic cylinder 15 installed inside the lower frame 7. The upward movement of the ram 9 pushes the lower bending tool 13 up against the upper bending tool 11, thereby bending the work piece W which is clamped between the upper and lower bending tools 11 and 13. Thus, in this embodiment, in order to bend the work piece W the ram 9 moves upward. However, the applicability of the present invention is not limited to this embodiment; this invention can also be applied in a press machine or bending press in which the ram is installed in the upper frames and moves downward to push one bending tool against the other.

Figure 2:
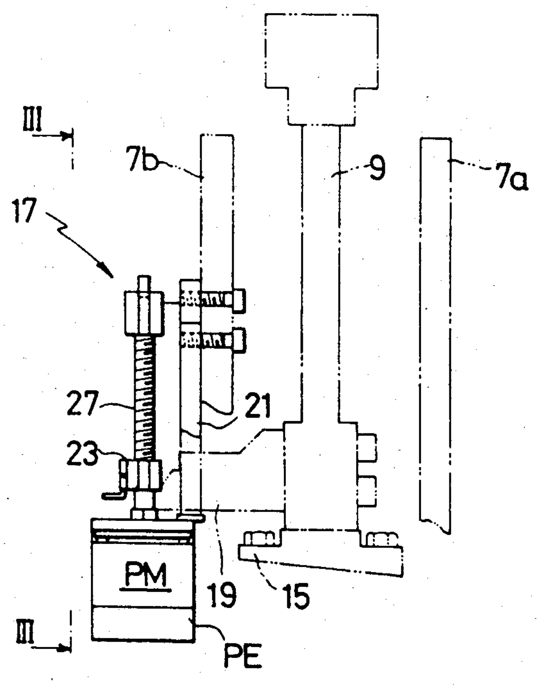
FIG. 2 is an enlarged cross-sectional view taken along the line II—II in FIG. 1.
Figure 3:
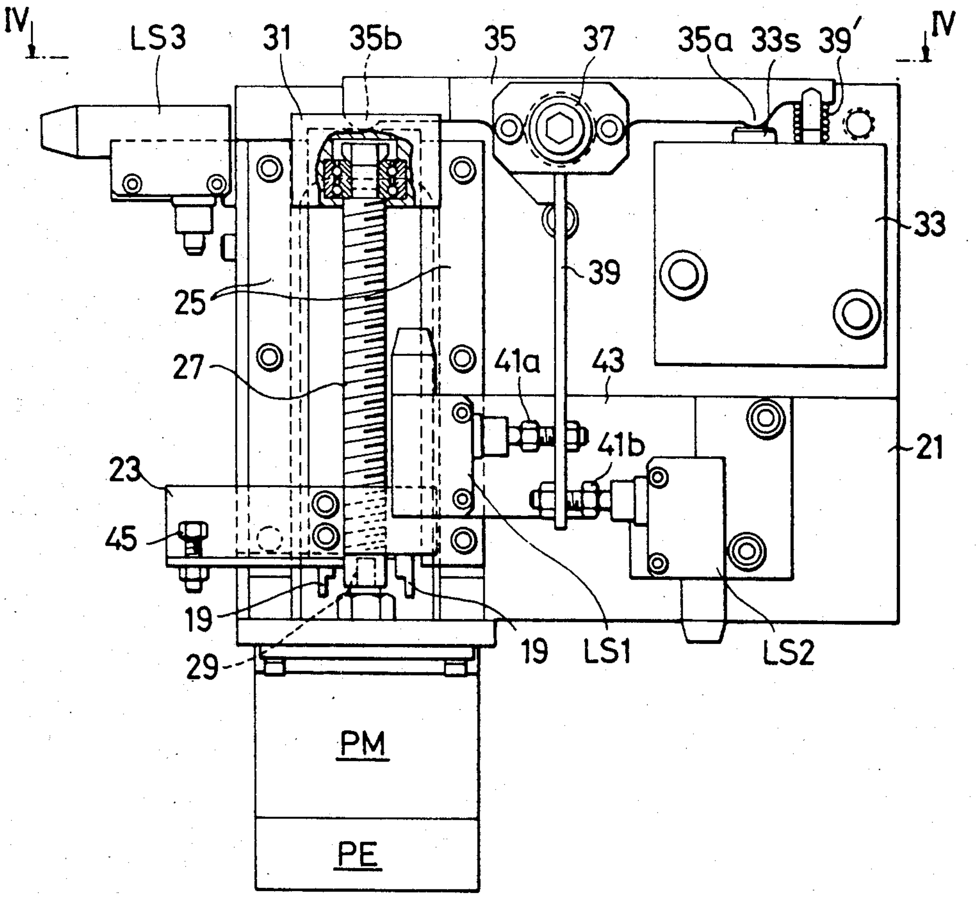
FIG. 3 is a view seen in the direction of the arrows III—III in FIG. 2.
Figure 4:
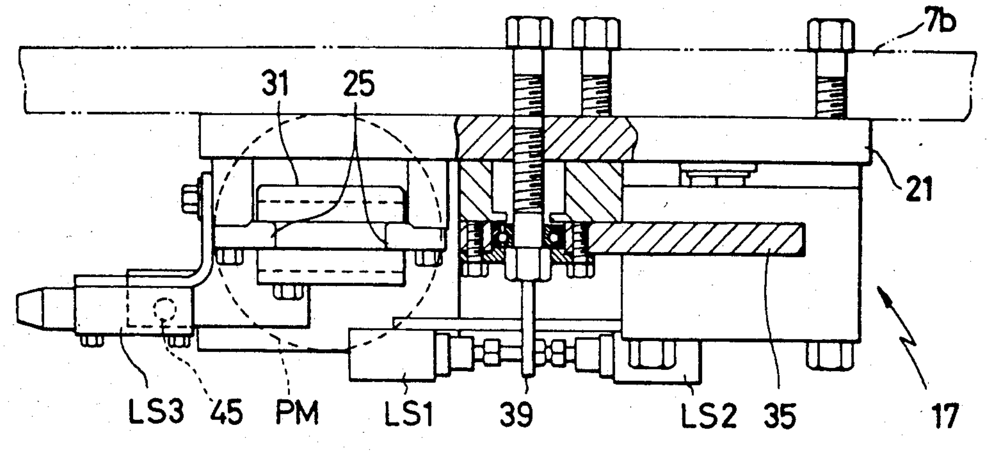
FIG. 4 is a cross-sectional view taken along the line IV—IV in FIG. 3.

Referring now to FIGS. 2 through 4, the hydraulic cylinder 15 which drives the up-and-down movement of the above-mentioned ram 9 is built into the lower part of the lower frame 7 having front and rear frames *7a* and *7b*. In this embodiment, an operation member 19, which is attached to the ram 9, operates a position determining device 17 to determine the position at which the upward movement of the ram is stopped. More specifically, the stop position determining device 17 is attached to the lower rear frame *7b*, which is located to the rear of the ram 9, through a bracket 21. The operation member 19 is located so that its tip sticks through the opening of the lower rear frame *7b* to within the range of movement of a position determining member 23, which is part of the position determining device 17 and is installed so that its position can be adjusted. The system is designed so that the upward movement of the ram 9 will stop when the operation member 19 contacts the position determining member 23. Consequently, the stop position of the ram 9 in the vertical operation can be controlled by adjusting the position of the stop position determining member 23.

As can be also seen from FIGS. 2 through 4, the position determining member 23 is designed so that its position is adjusted by a linear up-and-down motion. That is to say, two opposing guide rails 25 are mounted on the bracket 21. Those guide rails 25 support the position determining member 23 while allowing it to move up and down. The position determining member 23 is screwed into a threaded bolt 27 which is parallel to the guide rails 25. That threaded bolt 27 is coupled to a pulse motor PM which is mounted on the bracket 21. Consequently, by turning the threaded bolt 27 using the pulse motor PM, the position determining member 23 can be moved up and down along the guide rails 25.

In more detail, the pulse motor PM has a pulse encoder PE which detects the actual amount of rotation of the pulse motor PM and a rotating shaft 29, the lower end of which is spline-coupled to threaded bolt 27. In addition, the upper end of the threaded bolt 27 is rotatably supported by a bearing block 31, which is supported so that it is free to move up and down along the guide rails 25. Thus, when the upward motion of the ram 9 pushes the operation member 19 up against the position determining member 23, the position determining member 23 and the threaded bolt 27 can move upward together as a single unit.

In order to detect the contact of the operation member 19 with the position determining member 23 and stop the upward motion of the ram 9, the stop position determining device 17 has a switching valve 33 which opens and closes the hydraulic circuit to the hydraulic cylinder 15. That switching valve 33 has a slidable spool 33S which allows part of the hydraulic fluid in the hydraulic circuit to return to a tank when the spool 33S is depressed. One end of the spool 33S is in contact with one end *35a* of a lever 35. The lever 35 is connected to the brakcet 21 through a shaft 37 so that it is free to swing. The other end *35b* of the lever 35 is in contact wih the bearing block 31. The lever 35 is always held at the other end *35b* thereof in contact with the bearing block 31 by the action of an elastic body 39' such as a torsion spring or a compression spring.

As can be understood from the mechanism described above, when the operation member 19 contacts the position determining member 23, the lever 35 is rotated against the resistance of the elastic body 39', and the spool 33S of the switching valve 33 is pushed against one end 35a of the lever 35, causing the switching valve 33 to operate, thus stopping the upward motion of the ram 9.

When the pulse motor PM is operated to raise or lower the position determining member 23, in order to detect whether or not the position determining member 23 is in contact with the operation member 19, an auxiliary lever 39 is attached to the lever 35 at the center thereof and extends in an up-down direction. Dogs 41a and 41b are attached to both sides of the tip of that auxiliary lever 39 so that they can be adjusted. The dog 41a is opposite a first limit switch LS1 which is attached to a mounting plate 43 which is fixed to the bracket 21. The other dog 41b is opposite a second limit switch LS2 which is also attached to the mounting plate 43. Thus, the tip of the auxiliary lever 39 is located between the limit switches LS1 and LS2.

In the above-described configuration, as has already been discussed, when the operation member 19 contacts the position determining member 23, the lever 35 rotates, causing the normally closed contact of the second limit switch LS2 to open. Thus, the contact of the operation member 19 with the position determining member 23 is detected.

When an instruction to the pulse motor PM starts it rotating in such a direction as to turn the threaded bolt 27 in a direction that drives the position determining member 23 downward, the position determining member 23 contacts the operation member 19. In addition, when the threaded rod 27 rotates in such a direction as to advance downward, the bearing block 31 rises and the lever 35 rotates, pushing the spool 33S of the switching valve 33. If the spool 33S of the switching valve 33 is pushed farther than necessary, the first limit switch LS1 switches ON and the rotation commands to the pulse motor PM stop. In this manner the rotation of the threaded bolt 27 shows that the position determining member 23 cannot go down any farther.

A third limit switch LS3 is attached to the bracket to detect when the position determining member 23 has reached its upper limit. A dog 45 is attached to the position determining member 23 so that it can be freely adjusted, in order to operate the third limit switch LS3. Consequently, when the third limit switch LS3 has been operated, it is known that the position determining member 23 cannot be moved up any farther.

Figure 5:
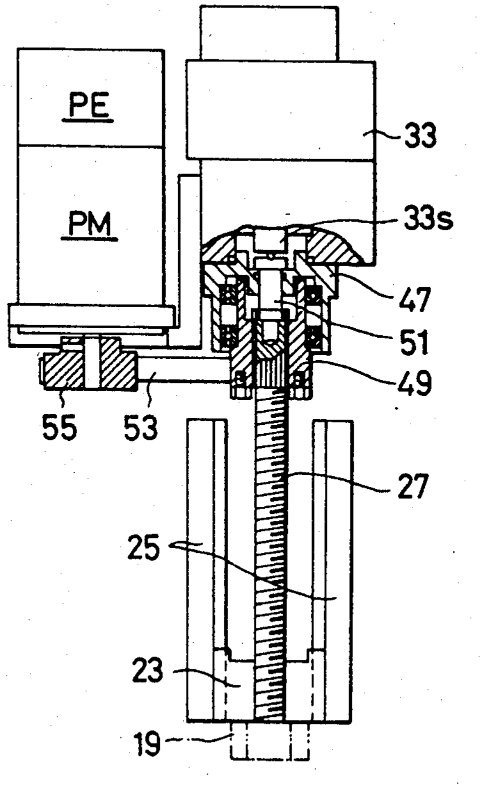
FIG. 5 is a partly broken and partly cross-sectional view of another embodiment of the present invention.

FIG. 5 shows another embodiment in which the threaded bolt 27 operates the swtiching valve 33 directly. In this embodiment, a driven pulley 49 is rotatably supported by a bearing block 47, which is attached to the switching valve 33. The upper tip of the threaded bolt 27 is spline-coupled to this driven pulley 49. In addition, the threaded bolt 27 is connected to the spool 33S of the switching valve 33 through a sliding pin 51. A belt 53 connects the driven pulley 49 to a driving pulley 55 which is in turn driven by the pulse motor PM.

Since this embodiment operates in a similar manner to the embodiment discussed above, like members having similar functions are designated by like numbers, and the detailed explanation is omitted here.

It should be noted that the present invention can be used in a number of different embodiments, For example, the position determining member 23 could have a slanted surface which the operation member 19 would contact, and a component of the force would move the position determining member 23. A configuration in which the position determining member 23 is adjusted by horizontal movement is also possible.

Referring again to FIG. 1, the press machine 1 has a control panel 57 which controls the press machine 1 and the pulse motor PM. More specifically, a control box 59 is mounted on either one of the above-mentioned right and left side frames 3R and 3L as appropriate. Mounted on this control box 59 is a supporting column 61 which sticks straight up and is free to rotate. That supporting column 61 in turn supports at the upper portion thereof the base of an arm 63 which can be adjusted by expansion and contraction. Rotatably depending from the tip of this arm 63 is a support bar 65, which supports at its lower end, the control panel 57. Thus, the position of the control panel 57 can be adjusted arbitrarily through a fairly wide range.

Figure 6:
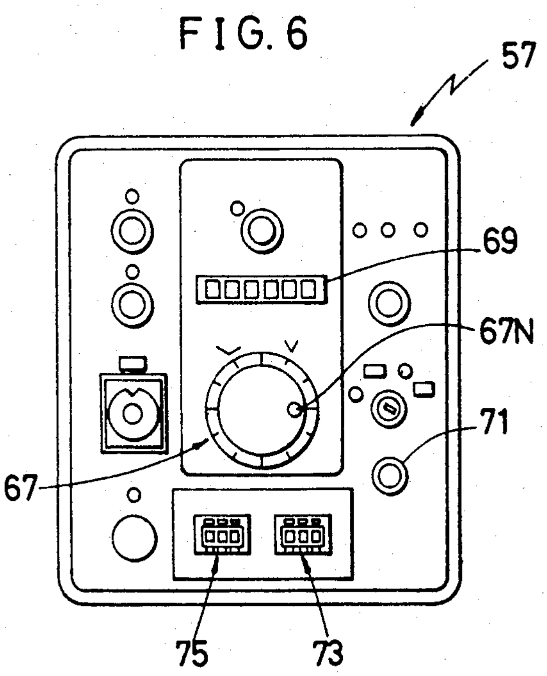
FIG. 6 is an enlarged front view of the control panel shown in FIG. 1.

As shown in detail in FIG. 6, the control panel 57 has a manual pulse generator 67 for operating the pulse motor PM and a position indicator 69 which receives the pulse signals from the pulse encoder PE and indicates the position of the position determining member 23. The control panel 57 also has an origin setting button 71 which sets as the origin the position to which the ram 9 has risen when the upper bending tool 11 and lower bending tool 13 are in direct contact to generate a predetermined pressure between them, a lower limit position setting switch 73 which can set the lower limit position of the ram 9 to any desired value, and a speed conversion position setting switch 75 which automatically changes the rising speed of the ram 9 at an arbitrarily selected position. The lower limit position setting switch 73 and speed conversion position setting switch 75 are digital switches, and their settings can be changed arbitrarily.

Figure 7:
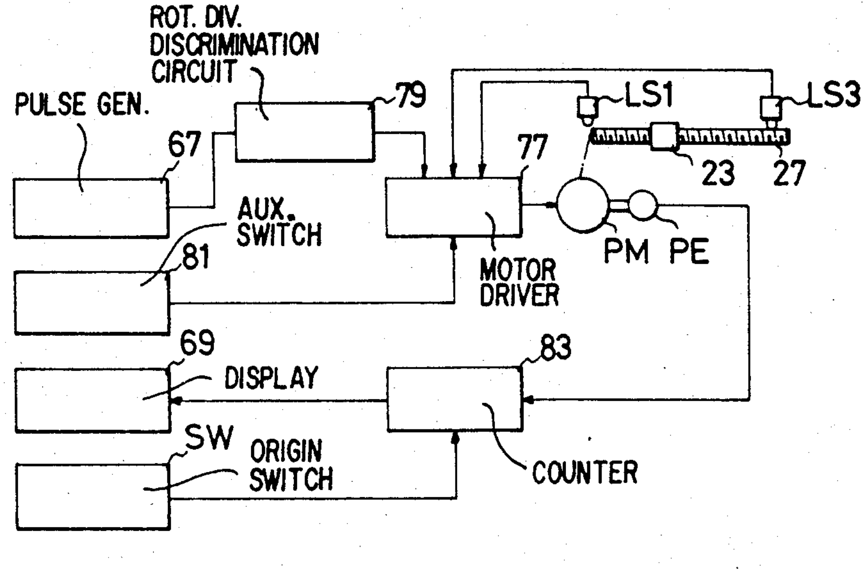
FIG. 7 is a block diagram of the pulse motor control system of the present invention.

The above-mentioned manual pulse generator 67 might, for example, be a pulse encoder. When a knob 67N is turned, pulses corresponding to the speed are generated. As shown in FIG. 7, this manual pulse generator 67 is connected to a motor driver 77, which drives the pulse motor PM, through a rotation direction discrimination circuit 79. Connected to the motor driver 77 are an auxiliary switch 81, which overrides input from the manual pulse generator 67, even when rotated, and prevents the pulse motor PM from turning, and the limit switches LS1 and LS3 which detect when the position determining member 23 has reached its moving limits.

Consequently, when the auxiliary switch 81 and the limit switches LS1 and LS3 are all closed, turning the knob 67N of the manual pulse generator 67 in the forward or reverse direction causes the pulse motor PM to turn in the forward or reverse direction at a rate corresponding to the speed. In this way the position of the position determining member 23 is adjusted.

The rotation of the pulse motor PM is detected by the pulse encoder PE. That pulse encoder PE is connected to a counter 83 which counts the pulses received from it. The value of the count is used by the position indicator 69 to provide a digital indication of the position of the position determining member 23. The counter 83 is cleared by the origin switch SW when the origin of the ram is to be set.

Consequently, by operating the manual pulse generator 67 while watching the position indicator 69, the position of the position determining member 23 can be set accurately, which also means that the position at which the ram 9 will stop rising is accurately determined. Since the actual rotation of the pulse motor PM is detected by the pulse encoder PE, the position of the position determining member 23 is always accurately indicated even if a step out problem occurs, for example, if the knob 67N of the manual pulse generator 67 is turned too fast and the pulse motor PM cannot keep up, or there are large load fluctuations beyond the following capability of the pulse motor PM. The pulse motor PM can be operated in either the forward or reverse direction automatically, without using the manual pulse generator 67, by connecting it to another suitable pulse generator.

Figure 8:
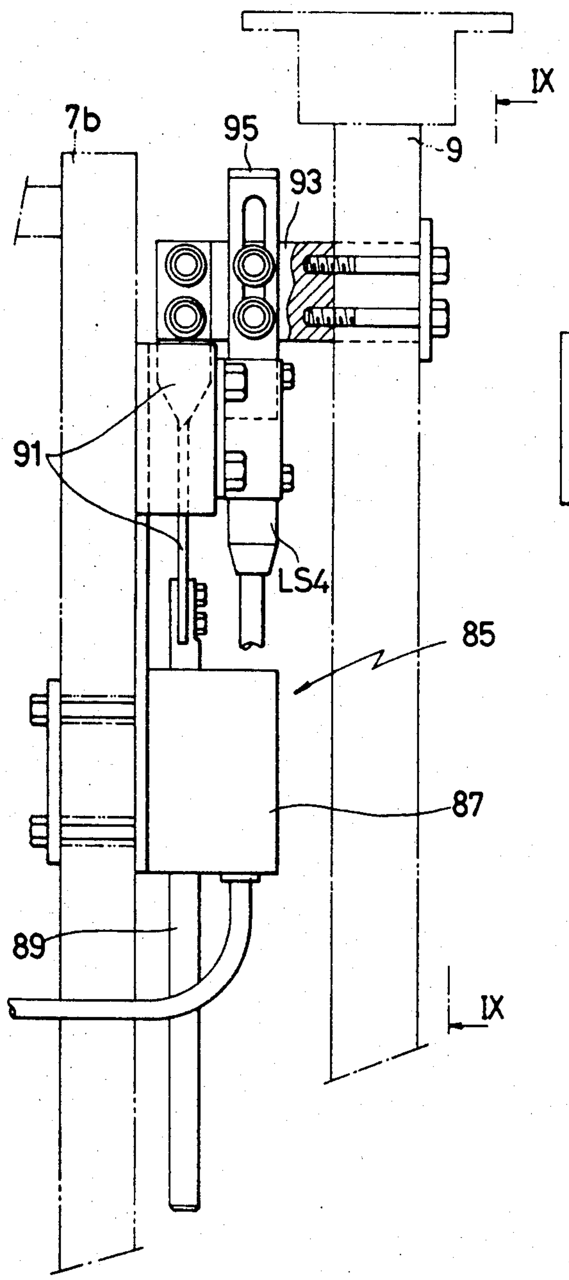
FIG. 8 is an enlarged cross-sectional view taken along the line VIII—VIII in FIG. 1.
Figure 9:
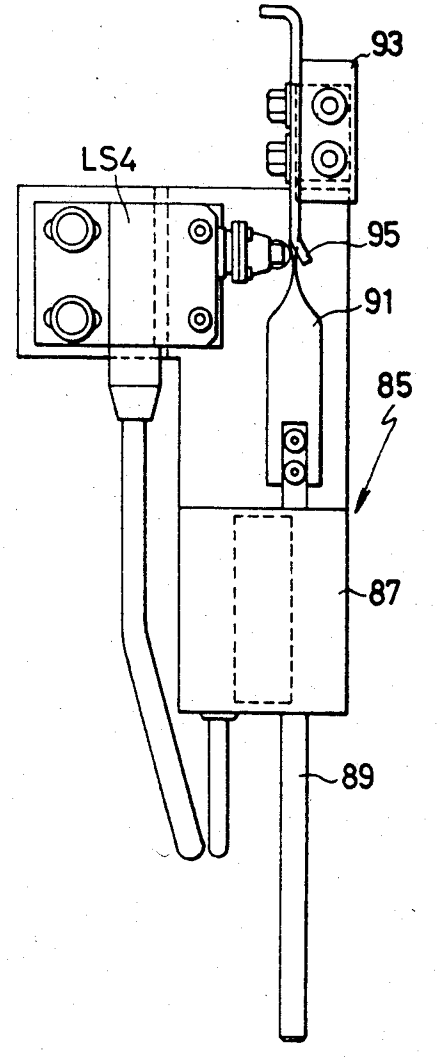
FIG. 9 is a view seen in the direction of the arrows IX—IX in FIG. 8.

Referring to FIGS. 8 and 9, the press machine 1 has a position detecting system 85 to detect the vertical position to which the ram 9 has been raised or lowered. More specifically, the position detecting system 85 comprises a position detector 87, such as a linear encoder, which is mounted on the lower rear frame *7b*, and a detection member 89 which is mounted on the position detector 87 so as to be able to move up and down freely. The upper tip of the detection member 89 is coupled to a coupling block 93, which is attached to the ram 9, through a suitable elastic body 91. In this embodiment, the elastic body 91 is a plate spring with a 90° twist. A lower limit dog 95 is fixed to the coupling block 93 so that its position can be freely adjusted up and down. Mounted on the lower rear frame 76 is a fourth limit switch LS4, which is operated by the lower limit dog 95 when the ram 9 has been lowered to its lower limit position.

In the configuration described above, the detection member 89 and the ram 9, which are coupled together, move up and down together, and pulses corresponding to the amount of vertical motion of the ram 9 are generated by the position detector 87. Consequently, by counting those pulses, the position to which the ram 9 has been raised or lowered can be detected and the necessary switching performed at the positions set by the lower limit position setting switch 73 and the speed conversion position setting switch 75.

When the ram 9, lowering from its raised position, reaches the position which has been set by the lower limit position setting switch 73, its lowering movement stops. When the ram 9, rising from its lowered position, reaches the position which has been set by the speed conversion position setting switch 75, the rising speed of the ram 9 is switched from fast to slow.

When the ram 9 moves up or down and its position is detected by the position detector 87 as discussed above, if errors occur in the positions of the surfaces of the coupling block 93 connected to the elastic body 91 and to the detctor 87, or if the ram 9 is deformed when the workpiece W is bent, the error can be absorbed by deformation of the elastic body 91. Thus, in the configuration described above, the position to which the ram 9 is raised or lowered can be accurately detected.

Referring again to FIG. 1, the control box 59 is connected to a foot pedal unit 99 through a cable 97. The foot pedal unit 99 can be positioned anywhere within a fairly wide range with respect to the control panel 57. The foot pedal unit 99 controls the speed of the vertically moving ram 9. It has a pedal 101U for upward movement and a pedal 101L for downward movement.

Figure 10:
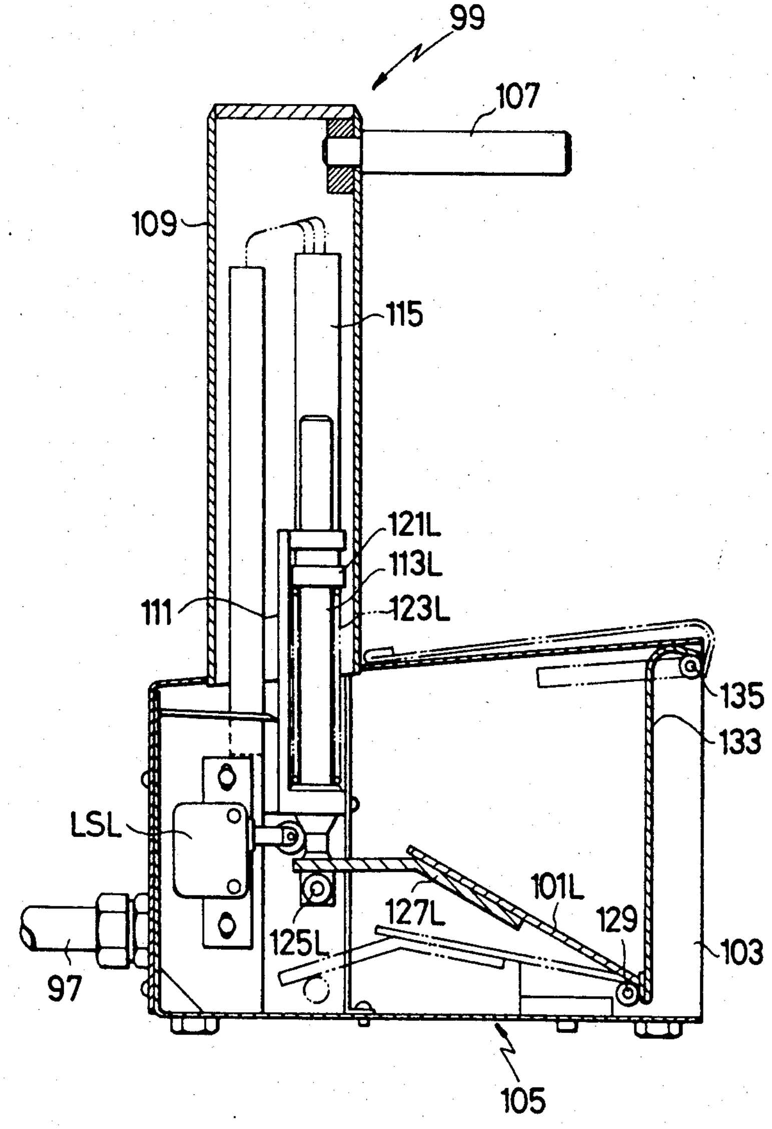
FIG. 10 is an enlarged cross-sectional view taken along the line X—X in FIG. 1.
Figure 11:
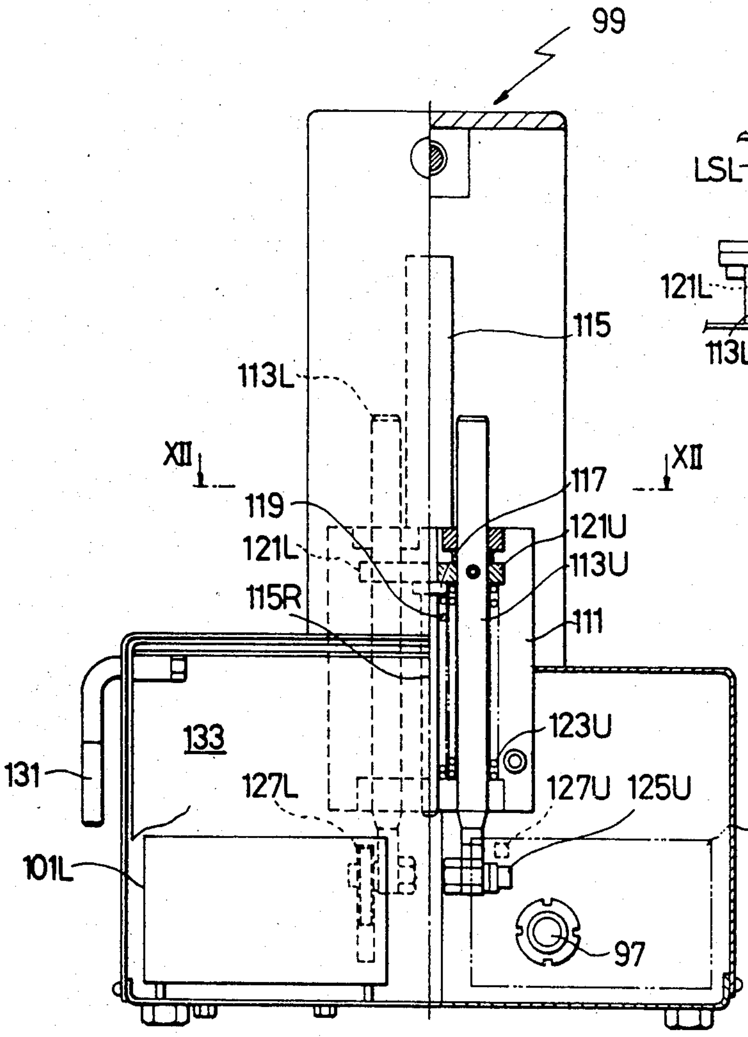
FIG. 11 is a partially cut-away side view of the section shown in FIG. 10.
Figure 12:
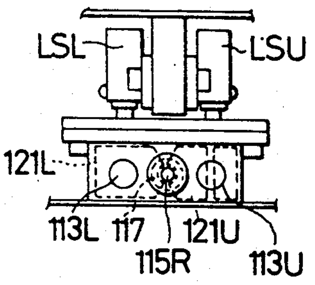
FIG. 12 is a cross-sectional view taken along the line XII—XII in FIG. 11.

As is shown best in FIGS. 10 through 12, the foot pedal unit 99 is contained in a box 105 which has an opening 103 on one side for inserting toes. This box 105 is made in one piece with a casing 109 which has a handle 107 on the top thereof. Inside this casing 109 are a pair of vertically moving rods 113U and 113L supported by a side bracket 111, inside the box 105, so that they can freely move up and down. In addition, a potentiometer 115 is mounted in a vertical position.

A disc-shaped stop member 117 is integrally mounted to an operation rod 115R of the potentiometer 115. The operation rod 115R is always pushed upward by the action of a spring 119 compressed between this stop member 117 and the bracket 111. Operation pieces 121U and 121L, which are free to contact the upper surface of the stop member 117, are attached to the vertically moving rods 113U and 113L. In addition, the vertically moving rods 113U and 113L are always biased upward by the action of springs 123U and 123L.

The diameters of the vertically moving rods 113U and 113L are reduced at their lower tips. Limit switches LSU and LSL are mounted in positions corresponding to such narrowed tips. In addition, roller 125U and 125L are attached to the lower tips of the vertically moving rods 113U and 113L. Levers 127U and 127L, which are connected to the pedals 101U and 101L, are in contact with the tops of the rollers 125U and 125L. The pedals 101U and 101L are pivotally attached to the inside of the box 105 through a shaft 129 which is rotatably supported by the bracket which is connected to the lower frame of the box 105. Further, a cover member 133, which has an opening and closing lever 131, is attached to the opening 103 of the box 105 so that it is free to open and close through a shaft 135, which is rotatably supported by the upper frame body of the box 105.

As has already become clear, in the configuration described above, when the pedal 101U for upward movement or the pedal 101L for downward movement is stepped on, one of the vertically moving rods 113U, 113L is lowered and the corresponding limit switch LSU or LSL operates. At the same time, the operation rod 115R of the potentiometer 115 is lowered. Thus, the action of the limit switch LSU or LSL is indicative of whether the ram 9 is being raised or lowered, and an output signal corresponding to the amount of motion of the operation rod 115R is thus obtained from the potentiometer 115. By controlling an electro-magnetic proportional valve to be described later with the output signal from this potentiometer 115, the rising or lowering speed of the ram 9 is controlled corresponding to the amount of foot pressure on the pedal 101U or 101L.

Figure 13:
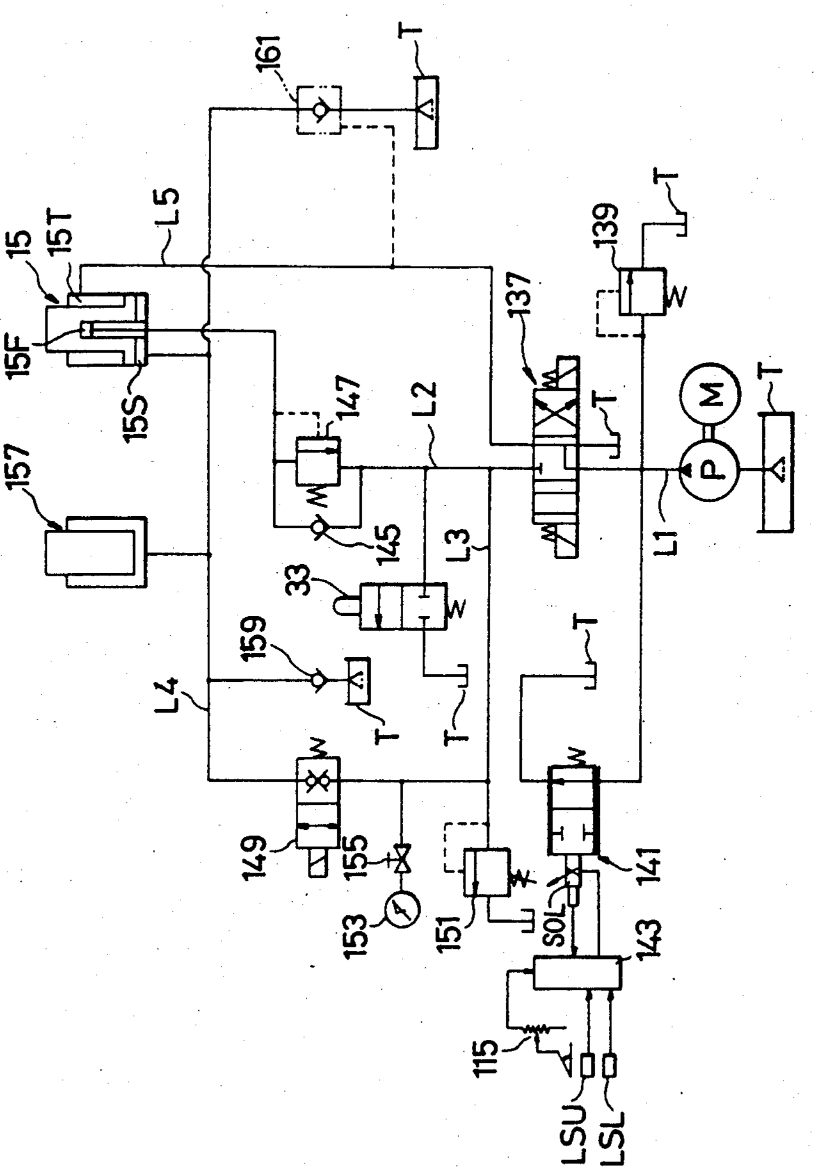
FIG. 13 is a hydraulic circuit diagram.

Referring to FIG. 13, a 4-port 3-position solenoid valve 137 is connected to a first hydraulic fluid path L1 which in turn is connected to a hydraulic pump P. At the same time, a relief valve 139 and an electromagnetic valve 141 are branch-connected. The electromagnetic proportional valve 141 is designed to control the flow rate of hydraulic fluid which is recirculated to the tank T in either direct or inverse proportion to the voltage applied to a solenoid SOL.

The solenoid SOL of the electromagnetic proportional valve 141 is controlled by a controller 143. The controller 143 receives input feedback signals for position detection of the spool of the electromagnetic proportional valve 141. The controller 143 is also connected to the potentiometer 115 and to the limit switches LSU and LSL. Consequently, the controller 143 can receive signals from the limit switches LSU and LSL, determine the directionality, and control the degree of opening of the electromagnetic proportional valve 141 corresponding to the output signal from the potentiometer 115.

The solenoid valve 137 is connected to a second hydraulic fluid path L2 which in turn is connected to a first chamber 15F of the above-mentioned cylinder 15 used for the vertical movement of the ram. This second hydraulic fluid path L2 is provided with a check valve 145 and a counterbalance valve 147 in parallel. In addition, the switching valve 33 is connected to a branch of the hydraulic system.

In addition, a third hydraulic fluid path L3 is connected as a branch of the second hydraulic fluid path. A speed conversion valve 149 is installed in this third hydraulic fluid path L3. A regulator 151 is branch-connected to the third hydraulic fluid path L3; and a manometer 153 is also branch-connected through a cutoff valve 155.

A fourth hydraulic fluid path L4, which is connected to the speed switching valve 149, also connected to a second chamber 15S of the hydraulic cylinder 15, and to an auxiliary cylinder 157; and, at the same time, it is connected to the tank T through a check valve 159 and a pilot - operated check valve 161.

In addition, a fifth hydraulic path L5, which is connected to the solenoid valve 137, is also connected to a third chamber 15T of the hydraulic cylinder 15.

In the configuration described above, stepping on the pedal 101U for upward movement of the foot pedal unit 99 cuts off the connection to the electromagnetic proportional valve 141; in addition, when the solenoid valve 137 is switched to connect the first hydraulic fluid path L1 to the second hydraulic fluid path L2, hydraulic fluid is supplied from the hydraulic fluid pump P to the first chamber 15F of the hydraulic cylinder 15, driving the ram 9 upward. At this time the rising speed of the ram 9 can be controlled by controlling the degree of opening of the electromagnetic proportional valve 141, which is done by adjusting the foot pressure on the pedal 101U in the foot pedal unit 99.

When the ram 9 is driven upward as described above, the position to which the ram 9 has risen is detected by the position detector 87. When the ram 9 rises to the position which has been set in advance by the speed conversion position setting switch 75, the speed switching valve 149 is operated. Hydraulic fluid is thus also supplied to the second chamber 15S of the cylinder 15 and to the auxiliary cylinder 157, and the rising speed of the ram 9 is switched from fast to slow. The workpiece W is thus bent between the upper bending tool 11 and the lower bending tool 13.

When, as discussed above, the ram 9 is raised, and the operation member 19 attached to the ram 9 contacts the position determining member 23, the switching valve 33 switches and part of the hydraulic fluid drains back to the tank T, so the rising of the ram 9 stops. After that, when the solenoid valve 137 switches, hydraulic fluid is supplied to the third chamber 15T of the cylinder 15, and, at the same time, the pilot-operated check valve 161 is opened causing the ram 9 to be lowered. At that time, the speed of lowering of the ram 9 can be controlled by ajusting the foot pressure on the pedal 101L in the foot pedal unit 99.

When the ram 9 is lowered as discussed above, and the position of the ram 9 as detected by the position detector 87 reaches the position which has been set in advance by the lower limit position setting switch 73, the lowering of the ram 9 stops.

As can be understood from the explanation above, the positions where the rising and lowering of a ram in a press machine stop can be set accurately. In addition, the speed of the vertically moving ram can be controlled accurately, and the position of the ram can be accurately detected.

While preferred embodiments of this invention have been shown and described, it will be appreciated that other embodiments will become apparent to those skilled in the art in light of the above teachings and within the purview of the appended claims without departing from the spirit and intended scope of the invention.

We claim:

1. A press machine comprising an upper and lower bending tool a vertically movable ram supporting either said upper or lower bending tool for providing relative movement between the tools; a hydraulic circuit operatively connected to said ram for driving said ram up and down; an electromagnetic proportional valve installed in said hydraulic circuit for controlling the speed of vertical movement of said ram; a speed control device operatively connected to and controlling the electromagnetic proportional valve said speed control being freely located at any desired position; wherein the speed of vertical movement of said ram is controlled proportionally in correspondence with the control amount of said speed control device.

2. The press machine as described in claim 1, wherein said speed control device is a foot pedal unit which has one pedal for upward movement and another pedal for downward movement; and a signal generating device is provided to generate signals corresponding to the amount of foot pressure on said pedals.

3. The press machine of claim 2, wherein said foot pedal unit includes a movable rod operatively connected with each of said pedal; said signal generating device includes potentiometer means associated with said movable rods for generating an output signal for controlling the speed of said ram.

4. The press machine of claim 3, wherein said proportional valve means is electrically connected to said potentiometer means.

5. The press machine of claim 4, wherein said potentiometer includes an operating rod which moves concurrently with the movable rods associated with said pedals.

6. The press machine of claim 5, further including limit switches operatively connected with said movable rods.

7. The press machine of claim 2, wherein said speed control device comprises a foot pedal unit for controlling the vertical movement of said ram.

* * * * *